UNITED STATES PATENT OFFICE.

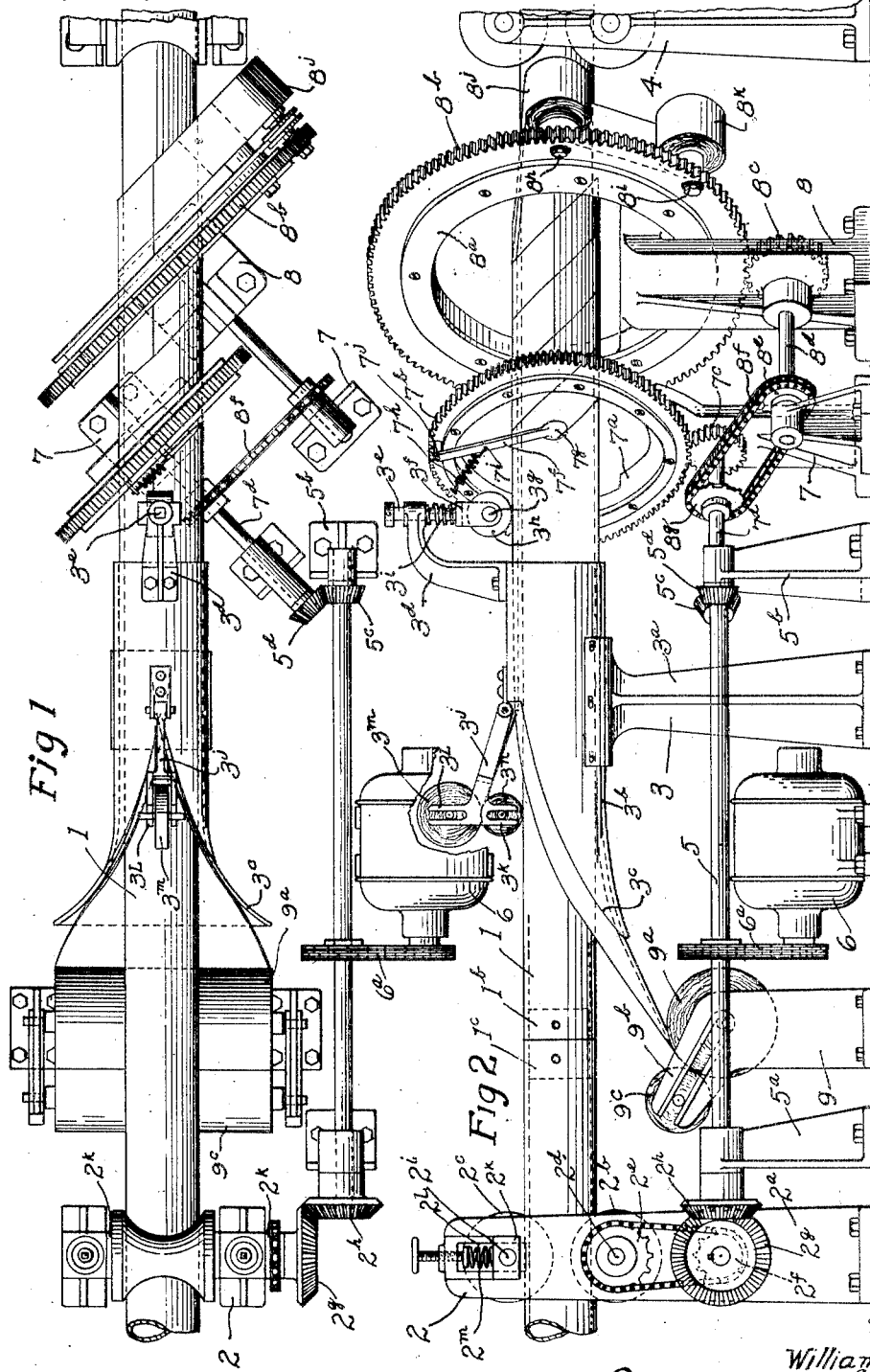

WILLIAM C. TYLER, OF RACINE, WISCONSIN, AND ALBERT H. KOZA, OF AKRON, OHIO, ASSIGNORS TO THE GOODYEAR TIRE & RUBBER COMPANY, OF AKRON, OHIO, A CORPORATION OF OHIO.

FABRIC CUTTING AND WINDING APPARATUS.

1,373,212.   Specification of Letters Patent.   Patented Mar. 29, 1921.

Application filed August 4, 1919. Serial No. 315,090.

*To all whom it may concern:*

Be it known that we, WILLIAM C. TYLER and ALBERT H. KOZA, citizens of the United States, and residents of Racine, Wisconsin, and Akron, Ohio, respectively, have invented new and useful Improvements in Fabric Cutting and Winding Apparatus, of which the following is a specification.

The invention relates broadly to a rotary bias cutter and winder for laying up a continuous length of fabric made up of short lengths, but more particularly it relates to an apparatus of that class for the purpose of producing a strip for use in tire making.

For some purposes, such as the manufacture of tires, it is necessary to cut the fabric on a bias so that it may have the proper elasticity, and in order to obtain the proper lengths of fabric so cut, it is further necessary to secure together, or splice in some suitable way, a number of short lengths, since the fabric material does not ordinarily come to the factory in the necessary widths to produce, when cut on a bias, a sufficiently long strip to be utilized with facility.

The operation of producing a continuous strip as usually practiced consists in cutting the fabric on a bias, while flat, and joining or splicing these strips by means of adhesive strips, which operation is done by hand, and the finished strip is finally rolled, wound, or layed upon spools.

The object of our invention is to provide an apparatus which shall, in one continuous operation, cut the material in one long uninterrupted strip, and wind the same in such a manner as to permit ready insertion into a tire building machine or other suitable apparatus.

It is more particularly the object of our invention to avoid the necessity of manipulation or hand work, with a material saving thereby of incident costs and time of operation, and at the same time producing a uniform finished article.

Other objects and advantages will appear as the description proceeds, all of which are conducive to economy both of costs and time, to simplicity of operation and uniformity of operation.

The following description taken in connection with the accompanying drawing, wherein we have illustrated a practical embodiment of our invention, will afford a clear understanding of our invention.

In this drawing:

Figure 1 is a horizontal plan; and

Fig. 2 is a side elevation of the apparatus.

A tubular mandrel 1, preferably made up of a plurality of sections which may be joined by providing male and female members $1^b$ and $1^c$ at the abutting ends of the sections, as shown in Fig. 1 or by any other suitable means, for example a bayonet joint, is supported by elements 2, 3 and 4, so as to travel from left to right.

The support 2 comprises a base $2^a$ having friction or bight rolls $2^b$ and $2^c$, preferably rubber covered, so formed as to provide between them a space through which the mandrel may pass. The lower roll $2^b$ is mounted on a shaft $2^d$ carrying at its outer end a sprocket wheel $2^e$ driven by a chain passing around a similar sprocket wheel $2^f$ which is, in turn, driven by a bevel gear $2^g$ intermeshing with a main gear $2^h$ carried by a main driving shaft 5. The upper friction roll $2^c$ is carried by a shaft $2^i$, at the outer ends of which are blocks $2^k$, sliding in corresponding guides $2^L$, the blocks being pressed downward by means of springs $2^m$, the tensions of which may be adjusted by any suitable device.

The support 3 comprises a base member $3^a$ carrying a former element $3^b$, said former being so shaped as to wrap the fabric about the mandrel as will presently be described. As shown it is composed of a cylinder cut away at its receiving ends $3^c$ and having the sides flared. The former element $3^b$ carries a bracket $3^d$ through the outer end of which passes a stem $3^e$ carrying, by means of a bifurcated element $3^f$, a shaft $3^g$, on which a small buffer wheel or roller $3^h$ is mounted. This roller $3^h$ is pressed normally against the face of the mandrel 1 by a spring $3^i$ and its function is to press an adhesive strip against the overlapped or abutted edges of the fabric to cause them to be joined before the cutting operation takes place.

The former element $3^b$ also carries a bracket $3^j$ having arms $3^k$ and $3^L$ which support the spindles of winding spools $3^m$ and $3^n$, the spool $3^m$ having the adhesive strip wound thereon while the spool $3^n$ winds up the strip of material which was rolled between the windings of the adhesive strip, and known in the art as a "liner."

The support 4 is similar to the support 2, except that no mandrel driving means has been provided.

The main driving shaft 5 is driven by any suitable power means, for example a motor 6, through the medium of sprocket wheels and chain $6^a$. The ends of the shaft 5 are supported by bearings $5^a$ and $5^b$, and at the end opposite to that carrying the bevel gear $2^h$ another bevel gear $5^c$ is arranged intermeshing with a bevel gear $5^d$ on a shaft $7^d$ presently to be described.

A base 7 carries an annular bearing $7^a$ encompassing the mandrel and having its axis arranged at an angle, other than a right angle, to the axis of the mandrel. The bearing $7^a$ has mounted thereon a gear wheel $7^b$ driven by an intermeshing gear pinion $7^c$ carried on the shaft $7^d$ and driven by the bevel gear $5^a$ referred to. This shaft $7^d$ is suitably mounted in bearings on the base 7 and support $7^e$.

The wheel $7^b$ has pivotally attached to the side thereof as at $7^e$, an arm $7^f$ carrying a knife $7^g$, which is held against the fabric carried by the mandrel 1, by means of a spring $7^h$, one end of which is secured to the arm $7^f$ at $7^i$ and the other to the wheel $7^b$ at $7^j$.

A base or support 8 is arranged adjacent the support 7 and carries an annular bearing $8^a$, having its axis at an angle to the axis of the mandrel 1. On this bearing is rotatably mounted a gear wheel $8^b$. The gear wheel $8^b$ is driven by a gear pinion $8^c$ carried at the end of a shaft $8^d$, which is in turn driven by a sprocket wheel $8^e$ and chain $8^f$, intermeshing with a sprocket $8^g$ on the shaft $7^d$. The shaft $8^d$ is suitably mounted in bearings on the supports 7 and 8 respectively.

The wheel $8^b$ carries two spindles $8^h$ and $8^i$ of spools or rolls $8^j$ and $8^k$ respectively, the former unwinding the finished fabric strip directly from the mandrel as the wheel $8^b$ rotates, and winding the fabric upon itself, while the latter spool $8^k$ carries a roll of liner material which is unwound therefrom and wound between the windings of finished fabric being wound on the spool $8^j$ to prevent adhesion of the material.

The purpose of the buffer wheel or roll $3^h$ as above described is to join the edges of the fabric by pressing an adhesive strip against said edges, and it will be obvious that any other device may be substituted for that shown, which will accomplish this function; for example, a stitcher mechanism may be utilized which will stitch the abutted or overlapped edges of the fabric by a chain or other form of stitch; as will be apparent to one skilled in the art to which this invention pertains.

A base or support 9 carries a roll $9^a$ on which the stock or fabric to be cut is wound. A bracket $9^b$ extends from the base 9 and carries a second roll or spindle $9^c$ on which the liner is wound up, which liner was rolled between the windings of material on the fabric roll $9^a$. The fabric is unwound from the roll $9^a$ and passes through the former $3^b$ and up around the mandrel 1 while the liner is wound up on the roll $9^c$.

From the above description of the apparatus its operation will be readily understood. It is as follows:

The motor 6 drives the main shaft 5 and causes the friction rolls $2^b$ to propel the mandrel 1 forward from left to right, the upper roll $2^c$ holding the mandrel in position and preventing play. The fabric on the roll $9^a$ is fitted by hand into the former and brought up around the mandrel to start the operation, and the adhesive strip is drawn down so as to join the edges of the fabric together. In operation the fabric is carried along while wound about the mandrel and the edges are being joined by the adhesive strip.

The liners from both the fabric and adhesive rolls are rewound on their respective rolls. The buffer roll $3^h$ compresses the adhesive strip firmly against the joint made by either abutting or overlapping the edges of the fabric.

The knife $7^g$ carried by the wheel $7^b$ is caused to wipe around the fabric on the mandrel so as to cut the fabric in a helical line, owing to the fact that the axis of the wheel $7^b$ is arranged at an angle to that of the mandrel, with the result that the fabric is cut on a bias and at the same time in one continuous strip.

The strip is then unwound from the mandrel by means of the rotating spool $8^j$, the liner material being unwound from the spool $8^k$ and on to the roll $8^j$ between the windings of the finished strip.

As the mandrel travels and the end protrudes from the support 4 the protruding section is disjointed and returned to the other end of the mandrel.

While we have illustrated a mandrel moving longitudinally in a horizontal plane, it will be obvious that the mandrel may be arranged to travel longitudinally in an oblique or in a vertical direction, which will necessitate only a rearrangement of parts, without departing from the essence of the invention as defined by the claims.

From the above description it will be seen that the apparatus forming the subject matter of our invention will continuously feed a strip of material cut on a bias for the purpose described, and wind the same ready for use, and while we have shown a specific embodiment thereof, it will be understood that we do not mean to be limited to this specific embodiment except by the claims hereto annexed which define the scope and extent of our invention.

What we claim is:

1. In an apparatus of the kind described, an element about which fabric is adapted to be wrapped, means for joining the edges of the fabric to hold the fabric wrapped about said element, and means for cutting the fabric on a bias.

2. In an apparatus of the kind described, an element about which fabric is adapted to be wrapped, means for joining the edges of the fabric to hold the fabric wrapped about said element, means for cutting the fabric on a bias and means for causing relative movement of the element with respect to the cutting means.

3. In an apparatus of the kind described, a mandrel about which fabric is adapted to be wrapped, means for joining the edges of the fabric to hold the fabric wrapped about said mandrel, means for cutting the fabric on a bias, and means for causing relative movement of the mandrel with respect to the cutting means.

4. In an apparatus of the kind described, a tubular mandrel about which fabric is adapted to be wrapped, means for causing said mandrel to travel longitudinally, means for joining the edges of the fabric to hold the fabric wrapped about said mandrel, and means for cutting the fabric on a bias.

5. In an apparatus of the kind described, a mandrel composed of sections, one abutting the other, and about which fabric is adapted to be wrapped, means for causing said mandrel to travel longitudinally and means for cutting the fabric on a bias.

6. In an apparatus of the kind described, a mandrel composed of hollow sections, one abutting the other, and about which fabric is adapted to be wrapped, means for causing said mandrel to travel longitudinally and means for cutting the fabric on a bias.

7. In an apparatus of the kind described, a mandrel composed of sections, longitudinally and disjointedly connected and about which fabric is adapted to be wrapped, means for causing said mandrel to travel longitudinally and means for cutting the fabric on a bias.

8. In an apparatus of the kind described, an element about which fabric is adapted to be wrapped, means for causing said element to travel longitudinally, means for joining the edges of the fabric to hold the fabric wrapped about said element, means for cutting the fabric on a bias, and means for winding the finished strip of fabric thereby produced.

9. In an apparatus of the kind described, a mandrel, means for causing said mandrel to travel longitudinally, a former for wrapping fabric about said mandrel, means for joining the edges of the fabric, and means for cutting the fabric on a bias.

10. In an apparatus of the kind described, a mandrel, means for causing said mandrel to travel longitudinally, a former for wrapping fabric about said mandrel, means for joining the edges of the fabric, and means for cutting the fabric on a bias, said last named means comprising a rotary cutter.

11. In an apparatus of the kind described, a mandrel, means for causing said mandrel to travel longitudinally, a former for wrapping fabric about said mandrel, said former comprising a cylindrical portion cut away and having a flared portion for receiving the fabric, means for joining the edges of said fabric and means for cutting said fabric on a bias.

12. In an apparatus of the kind described, a mandrel, means for causing said mandrel to travel longitudinally, a former for wrapping fabric about said mandrel, said former comprising a cylindrical portion cut away and having a flared portion for receiving the fabric, means for joining the edges of said fabric and means for cutting said fabric on a bias, said last named means comprising a rotary cutter.

13. In an apparatus of the kind described, a mandrel, means for causing said mandrel to travel longitudinally, a former for wrapping fabric about said mandrel, means for joining the edges of said fabric, means for cutting the fabric on a bias, and means for winding the finished strip of fabric thereby produced.

14. In an apparatus of the kind described. a mandrel, means for causing said mandrel to travel longitudinally, a former for wrapping fabric about said mandrel, means for joining the edges of the fabric, means for cutting the fabric on a bias, said cutting means comprising a rotary cutter, and means for winding the finished strip of fabric thereby produced.

15. In an apparatus of the kind described, a mandrel, means for causing said mandrel to travel longitudinally, a former for wrapping fabric about said mandrel, means for joining the edges of the fabric and a rotary cutter comprising an element rotating about an axis at an angle other than a right angle to the axis of said mandrel.

16. In an apparatus of the kind described, a mandrel, means for causing said mandrel to travel longitudinally, a former for wrapping fabric about said mandrel, means for joining the edges of the fabric and a rotary cutter comprising an element rotating about an axis at an angle other than a right angle to the axis of said mandrel, said rotating element having a knife connected thereto, said knife being adapted to pass around said mandrel in contact with the fabric wrapped thereon and in a helical line.

17. In an apparatus of the kind described, a mandrel, means for causing said mandrel to travel longitudinally, a former for wrapping fabric about said mandrel, means for joining the edges of the fabric, a rotary cutter comprising an element rotating about an axis at an angle other than a right angle to the axis of said mandrel, and means for winding the finished strip of fabric thereby produced.

18. In an apparatus of the kind described, a mandrel, means for causing said mandrel to travel longitudinally, a former for wrapping fabric about said mandrel, means for joining the edges of the fabric, a rotary cutter comprising an element rotating about an axis at an angle other than a right angle to the axis of said mandrel, said rotating element having a knife connected thereto, said knife being adapted to pass around said mandrel in contact with the fabric wrapped thereon and in a helical line.

19. In an apparatus of the kind described, a mandrel, a friction roll in contact with said mandrel, means for driving said friction roll to cause the mandrel to travel longitudinally, a cylindrical element through which the mandrel travels, said element having a flared end adapted to receive fabric and wrap it about said mandrel, means for joining the edges of the fabric, and means for cutting the fabric on a bias.

20. In an apparatus of the kind described, a mandrel, a friction roll in contact with said mandrel, means for driving said friction roll to cause the mandrel to travel longitudinally, a cylindrical element through which the mandrel travels, said element having a flared end adapted to receive fabric and wrap it about said mandrel, means for joining the edges of the fabric, and means for cutting the fabric on a bias, said last named means comprising a rotary cutter.

21. In an apparatus of the kind described, a mandrel, a friction roll in contact with said mandrel, means for driving said friction roll to cause the mandrel to travel longitudinally, a cylindrical element through which the mandrel travels, said element having a flared end adapted to receive fabric and wrap it about said mandrel, means for joining the edges of the fabric, and means for cutting the fabric on a bias, said last named means comprising a knife adapted to pass around said mandrel in contact with the fabric wrapped thereon and in a helical line.

22. In an apparatus of the kind described, a mandrel composed of sections longitudinally and disjointedly connected, means for causing said mandrel to travel uniformly and continuously from one end of the apparatus to the other, said means including a friction roll in contact with said mandrel, a cylindrical former having a flared end for wrapping the fabric about said mandrel, means for feeding fabric to said flared end of the former, means for feeding a strip of adhesive material whereby said strip is laid over the edges of said fabric when brought together, means for compressing the adhesive material against the edges of said fabric to join the same, an element rotating about said mandrel and in a plane at an angle other than a right angle to a plane passing through the axis of said mandrel, said rotating element carrying a knife adapted to pass in contact with said fabric on said mandrel, and common means for simultaneously operating said friction roll and said rotating element.

23. In an apparatus of the kind described, a mandrel composed of sections longitudinally and disjointedly connected, means for causing said mandrel to travel uniformly and continuously from one end of the apparatus to the other, said means including a friction roll in contact with said mandrel, a cylindrical former having a flared end for wrapping the fabric about said mandrel, means for feeding fabric to said flared end of the former, means for feeding a strip of adhesive material whereby said strip is laid over the edges of said fabric when brought together, means for compressing the adhesive material against the edges of said fabric to join the same, an element rotating about said mandrel and in a plane at an angle other than a right angle to a plane passing through the axis of said mandrel, said rotating element carrying a knife adapted to pass in contact with the fabric on said mandrel, means for winding the finished strip of fabric thereby produced, said last-named means comprising an element rotating about said mandrel and carrying a roll on which said finished strip is wound, and common means for simultaneously operating said friction roll, and both said rotating elements.

In witness whereof, we have hereunto signed our names in the presence of two subscribing witnesses.

WILLIAM C. TYLER.
ALBERT H. KOZA.

Witnesses for Tyler:
  W. P. RITTER,
  EMMA LEMKE.
Witnesses for Koza:
  C. A. STRAW, JR.,
  E. C. LEADENHAM.